(12) United States Patent
Bracey (10) Patent No.: US 8,532,282 B2
(45) Date of Patent: Sep. 10, 2013

(54) TRACKING USER OPERATIONS

(75) Inventor: William M. Bracey, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1746 days.

(21) Appl. No.: 11/026,788

(22) Filed: Dec. 31, 2004

(65) Prior Publication Data

US 2005/0278630 A1    Dec. 15, 2005

Related U.S. Application Data

(60) Provisional application No. 60/579,343, filed on Jun. 14, 2004.

(51) Int. Cl.
*H04M 3/00* (2006.01)

(52) U.S. Cl.
USPC .................................... 379/265.06

(58) Field of Classification Search
USPC .................... 709/224; 717/143; 379/265.02, 379/265.06, 88.19; 706/45; 726/22
See application file for complete search history.

(56) References Cited

U.S. PATENT DOCUMENTS

| | | | |
|---|---|---|---|
| 5,678,034 A | 10/1997 | Chew | |
| 5,757,371 A | 5/1998 | Oran et al. | |
| 5,838,317 A | 11/1998 | Bolnick et al. | |
| 5,870,552 A | 2/1999 | Dozier et al. | |
| 5,920,316 A | 7/1999 | Oran et al. | |
| 5,982,857 A * | 11/1999 | Brady | 379/88.19 |
| 5,999,176 A | 12/1999 | Kamper | |
| 6,023,272 A | 2/2000 | Malamud et al. | |
| 6,040,833 A | 3/2000 | Henshaw | |
| 6,215,490 B1 | 4/2001 | Kaply | |
| 6,275,230 B1 | 8/2001 | Ingrassia, Jr. et al. | |
| 6,456,307 B1 | 9/2002 | Bates et al. | |
| 6,473,505 B1 | 10/2002 | Khuc et al. | |
| 6,519,571 B1 | 2/2003 | Guheen | |
| 6,611,498 B1 | 8/2003 | Baker et al. | |
| 6,642,946 B1 | 11/2003 | Janes et al. | |
| 6,643,661 B2 | 11/2003 | Polizzi | |
| 6,662,226 B1 * | 12/2003 | Wang et al. | 709/224 |
| 6,738,817 B1 | 5/2004 | Chen | |
| 6,941,371 B2 | 9/2005 | Hartmann | |
| 6,957,395 B1 | 10/2005 | Jobs et al. | |
| 6,983,155 B1 | 1/2006 | Cook | |
| 7,100,195 B1 | 8/2006 | Underwood | |
| 7,225,244 B2 | 5/2007 | Reynolds et al. | |

(Continued)

OTHER PUBLICATIONS

Sims; U.S. Appl. No. 11/026,693, filed Dec. 31, 2004.

(Continued)

*Primary Examiner* — Duc Nguyen
*Assistant Examiner* — Sonia Gay
(74) *Attorney, Agent, or Firm* — Scott P. Zimmerman, PLLC (57) ABSTRACT

Embodiments of the present disclosure provide systems and methods for capturing user interface operations. Briefly described, in architecture, one embodiment of the system, among others, includes logic configured to monitor an operation performed by an application interface; logic configured to determine whether the operation is at least one milestone event that is to be saved, wherein the at least one milestone event is a user-interface operation for a process in a particular field of operation; and logic configured to save milestone event information from a user, the information including identification of the user performing the operation and a computer application that was being accessed by the user for the process. Other systems and methods are also included.

14 Claims, 5 Drawing Sheets

(56) References Cited

U.S. PATENT DOCUMENTS

| | | | |
|---|---|---|---|
| 7,228,244 B2 | 6/2007 | Xin | |
| 7,263,655 B1 | 8/2007 | Carden, Jr. | |
| 7,523,413 B2 | 4/2009 | Sims | |
| 7,574,657 B2 | 8/2009 | Chand | |
| 7,590,945 B2 | 9/2009 | Sims et al. | |
| 7,607,090 B2 | 10/2009 | McGlennon et al. | |
| 2001/0029534 A1 | 10/2001 | Spinks et al. | |
| 2001/0035882 A1 | 11/2001 | Stoakley et al. | |
| 2001/0047417 A1 | 11/2001 | Hartmann | |
| 2002/0111824 A1 | 8/2002 | Grainger | |
| 2002/0129139 A1* | 9/2002 | Ramesh | 709/224 |
| 2002/0130904 A1 | 9/2002 | Becker et al. | |
| 2003/0009752 A1 | 1/2003 | Gupta | |
| 2003/0048286 A1 | 3/2003 | Lal | |
| 2003/0071849 A1 | 4/2003 | Ferri | |
| 2003/0088640 A1 | 5/2003 | Rasheed et al. | |
| 2003/0189597 A1 | 10/2003 | Anderson et al. | |
| 2004/0010574 A1 | 1/2004 | Cammick | |
| 2004/0028212 A1 | 2/2004 | Lok et al. | |
| 2004/0103409 A1* | 5/2004 | Hayner et al. | 717/143 |
| 2004/0117376 A1 | 6/2004 | Lavin | |
| 2004/0191744 A1 | 9/2004 | Guirguis | |
| 2004/0203750 A1 | 10/2004 | Cowdrey et al. | |
| 2004/0261037 A1 | 12/2004 | Ording et al. | |
| 2005/0044197 A1 | 2/2005 | Lai | |
| 2005/0063530 A1 | 3/2005 | Cook et al. | |
| 2005/0066037 A1 | 3/2005 | Song et al. | |
| 2005/0114792 A1 | 5/2005 | Gest | |
| 2005/0132299 A1 | 6/2005 | Jones et al. | |
| 2005/0144150 A1* | 6/2005 | Ramamurthy et al. | 706/45 |
| 2005/0153706 A1 | 7/2005 | Niemenmaa et al. | |
| 2005/0172235 A1 | 8/2005 | Cragun et al. | |
| 2005/0183143 A1* | 8/2005 | Anderholm et al. | 726/22 |
| 2007/0219842 A1 | 9/2007 | Bansal et al. | |
| 2008/0267388 A1* | 10/2008 | Odinak et al. | 379/265.09 |

OTHER PUBLICATIONS

Omanson; U.S. Appl. No. 11/026,689, filed Dec. 31, 2004.
Sims; U.S. Appl. No. 11/027,325, filed Dec. 31, 2004.
Sims; U.S. Appl. No. 11/027,324, filed Dec. 31, 2004.
Chand; U.S. Appl. No. 11/026,677, filed Dec. 31, 2004.
McGlennon; U.S. Appl. No. 11/026,695, filed Dec. 31, 2004.
Sims; U.S. Appl. No. 11/026,679, filed Dec. 31, 2004.
Sims; Non-Final Rejection mailed Jul. 27, 2007; U.S. Appl. No. 11/026,693, filed Dec. 31, 2004.
Omanson; Non- Final Rejection mailed Oct. 9, 2007; U.S. Appl. No. 11/026,689, filed Dec. 31, 2004.
Sims; Non-Final Rejection mailed Aug. 22, 2007; U.S. Appl. No. 11/027,325, filed Dec. 31, 2004.
Chand; Non-Final Rejection mailed Oct. 9, 2007; U.S. Appl. No. 11/026,677, filed Dec. 31, 2004.
McGlennon; Non-Final Rejection mailed Aug. 9, 2007; U.S. Appl. No. 11/026,695, filed Dec. 31, 2004.
Sims; Non-Final Rejection mailed Nov. 21, 2007; U.S. Appl. No. 11/026,679, filed Dec. 31, 2004.
http://web.archive.org/web/20040306185255/www.corizon.com/benefits.html benefits: overview Mar. 6, 2004 (printed Dec. 23, 2006); 1 page.
http://web.archive.org/web/20040310140931/www.corizon.com/enterprise_features.html platform enterprise edition features: 1-3 Mar. 10, 2004 (printed Dec. 23, 2006); 3 pages.
http://web.archive.org/web/20040216191845/www.corizon.com/solutions.html Corizon Solution Feb. 16, 2004 (printed Dec. 23, 2006); 1 page.
http://web.archive.org/web/20040504231018/www.corizon.com/platform_overview.html Corizon Platform Overview May 4, 2004 (printed Dec. 23, 2006); 1 page.
http://web.archive.org/web/20040313213357/www.corizon.com/it_benefits.html Benefits for IT organisations Mar. 13, 2004 (printed Dec. 23, 2006); 1 page.
http://web.archive.org/web/20040407091225/www.corizon.com/user_benefits.html benefits for users Apr. 7, 2004 (printed Dec. 23, 2006); 1 page.
http://web.archive.org/web/20040603045823/www.netmanage.com/products/rumba/rumbaOffice.asp Rumba Office and ViewNow Jun. 3, 2004 (printed Dec. 23, 2006); 2 pages.
http://web.archive.org/web/20040603045823/http://www.netmanage.com/products/pdf/datasheets/52078-RUMBA-ENT-DS-04-04.pdf Windows-Based and Browser-Based Multi-Host Access for Evolving Enterprises Jun. 3, 2004 (printed Dec. 23, 2006); 2 pages.
http://web.archive.org/web/20040126023051/www.netmanage.com/hap/hap_access.asp Access Services Jan. 26, 2004 (printed Dec. 23, 2006); 1 page.
http://web.archive.org/web/20040404202850/www.netmanage.com/hap/hap_integration.asp Integration Services Apr. 4, 2004 (printed Dec. 23, 2006); 2 pages.
http://web.archive.org/web/20040603045044/www.netmanage.com/products/rumba/index.asp Powerful Host Access for the Evolving Enterprise Jun. 3, 2004 (printed Dec. 23, 2006); 2 pages.
http://web.archive.org/web/20040603082621/www.netmanage.com/products/rumba/rumbaw2h.asp Powerful, Secure, Easy-To-Deploy Host Access Jun. 3, 2004 (printed Dec. 23, 2006); 2 pages.
http://web.archive.org/web/20040402102021/www.netmanage.com/hap/hap_presentation.asp Presentation Services Apr. 2, 2004 (printed Dec. 23, 2006); 2 pages.
http://web.archive.org/web/20040125114121/http://toolbar.google.com/ Google Toolbar Jan. 25, 2004 (printed Dec. 23, 2006); 1 page.
http://web.archive.org/web/20040204014210/toolbargoogle.com/menu_help.html Google Toolbar Feb. 4, 2004 (printed Dec. 23, 2006); 3 pages.
http://web.archive.org/web/20040217111141/toolbargoogle.com/options_help.html Google Toolbar Options Feb. 17, 2004 (printed Dec. 23, 2006); 4 pages.
http://web.archive.org/web/20031206080131/toolbar.google.com/button_help.html Google Toolbar Features Dec. 6, 2003 (printed Dec. 23, 2006); 6 pages.
http://www.smartcomputing.com/editorial/article.asp?article=articles/archive/office97/09704/09704.asp&guid= Take a Shortcut to Office 87 Sep. 1998, vol. 2, Issue 3 of Smart Computing (printed Dec. 23, 2006); 7 pages.
http://www.codeproject.com/CSHARP/CSDOESSHELL3.ASP C# does Shell, Part 3 Mar. 3, 2003 (printed Dec. 23, 2006); 19 pages.
http://www.siebel.com/products/service/call_center/support_for_multiple_c.shtm May 25, 2004; 2 pages.
Microsoft Contact Center Framework White Paper Dec. 2003; 17 pages.
Microsoft Contact Center Framework A Guide to Business Benefits Dec. 2003; 13 pages.
Omanson, U.S. Appl. No. 11/026,689, filed Dec. 31, 2004.
Sims, U.S. Appl. No. 11/026,693, filed Dec. 31, 2004.
Bracey, U.S. Appl. No. 11/026,788, filed Dec. 31, 2004.
Chand, U.S. Appl. No. 11/026,677, filed Dec. 31, 2004.
McGlennon; Non-Final Rejection mailed Jun. 13, 2008 for U.S. Appl. No. 11/026,695, filed Dec. 31, 2004.
Sims; Non-Final Rejection mailed Jun. 9, 2008 for U.S. Appl. No. 11/027,324, filed Dec. 31, 2004.
Sims; Final Rejection mailed May 21, 2008 for U.S. Appl. No. 11/026,679, filed Dec. 31, 2004.
Chand; Final Rejection mailed Apr. 16, 2008 for U.S. Appl. No. 11/026,677, filed Dec. 31, 2004.
Omanson; Non-Final Rejection mailed Oct. 9, 2007 for U.S. Appl. No. 11/026,689, filed Dec. 31, 2004.
Sims; Non-Final Rejection mailed Aug. 22, 2007 for U.S. Appl. No. 11/027,325, filed Dec. 31, 2004.
Sims; Non-Final Rejection mailed Jun. 9, 2008 for U.S. Appl. No. 11/027,325, filed Dec. 31, 2004.
Sims; Non-Final Rejection mailed Jul. 27, 2007 for U.S. Appl. No. 11/027,324, filed Dec. 31, 2004.
Sims; Examiner Interview Summary mailed Oct. 23, 2007 for U.S. Appl. No. 11/026,693, filed Dec. 31, 2004.
Sims; Non-Final Rejection mailed Jun. 11, 2008 for U.S. Appl. No. 11/026,693, filed Dec. 31, 2004.
Sims; Non-Final Rejection mailed Jul. 27, 2007 for U.S. Appl. No. 11/026,693, filed Dec. 31, 2004.
Chand; Non-Final Rejection mailed Oct. 9, 2007 for U.S. Appl. No. 11/026,677 filed Dec. 31, 2004.

McGlennon; Examiner Interview Summary mailed Aug. 14, 2008 for U.S. Appl. No. 11/026,695, filed Dec. 31, 2004.
Sims; Examiner Interview Summary mailed Aug. 14, 2008 for U.S. Appl. No. 11/027,325, filed Dec. 31, 2004.
Sims; Examiner Interview Summary mailed Aug. 13, 2008 for U.S. Appl. No. 11/027,324, filed Dec. 31, 2004.
Sims; Examiner Interview Summary mailed Aug. 13, 2008 for U.S. Appl. No. 11/026,693, filed Dec. 31, 2004.
Windows Version 5.1, copyright 2001, screenshots 1-7.
Chand,Examiner Interview Summary mailed Dec. 4, 2008 for U.S. Appl. No. 11/026,677, filed Dec. 31, 2004.
McGlennon; Final Rejection mailed Jan. 17, 2008; U.S. Appl. No. 11/026,695, filed Dec. 31, 2004.
McGlennon; Non-Final Rejection, mailed Aug. 9, 2007 for U.S. Appl. No. 11/026,695, filed Dec. 31, 2004.
McGlennon; U.S. Patent Application for U.S. Appl. No. 11/026,695, filed Dec. 31, 2004.
Omanson, Non-Final Rejection mailed Oct. 9, 2007 for U.S. Appl. No. 11/026,689, filed Dec. 31, 2004.
Omanson; Examiner Interview Summary mailed Dec. 24, 2008 for U.S. Appl. No. 11/026,689, filed Dec. 31, 2004.
Omanson; Examiner Interview Summary Record mailed Jan. 7, 2008; U.S. Appl. No. 11/026,689, filed Dec. 31, 2004.
Sims; Examiner Interview Summary Record mailed Oct. 23, 2007; U.S. Appl. No. 11/027,324, filed Dec. 31, 2004.
Sims; Final Rejection mailed Jan. 7, 2008; U.S. Appl. No. 11/027,324, filed Dec. 31, 2004.
Sims; Final Rejection, mailed Jan. 8, 2008 for U.S. Appl. No. 11/027,324, filed Dec. 31, 2004.
Sims; Non-Final Rejection mailed Jul. 27, 2007; U.S. Appl. No. 11/027,324, filed Dec. 31, 2004.
Sims; Non-Final Rejection mailed Nov. 21, 2007 for U.S. Appl. No. 11/026,679, filed Dec. 31, 2004.
Sims; Examiner Interview Summary Record mailed Oct. 23, 2007; U.S. Appl. No. 11/026,693, filed Dec. 31, 2004.
Sims; Final Rejection mailed Jan. 16, 2008; U.S. Appl. No. 11/026,693, filed Dec. 31, 2004.
Chand, S., Non-Final Rejection mailed Oct. 9, 2007, U.S. Appl. No. 11/026,677, filed Dec. 31, 2004.
Sims; Final Rejection mailed Dec. 3, 2008 for U.S. Appl. No. 11/027,325, filed Dec. 31, 2004.
Sims; Notice of Allowance and Fees Due mailed Dec. 11, 2008 for U.S. Appl. No. 11/026,693, filed Dec. 31, 2004.
McGlennon; Final Rejection mailed Dec. 3, 2008 for U.S. Appl. No. 11/026,695, filed Dec. 31, 2004.
Sims; Final Rejection mailed Nov. 20, 2008 for U.S. Appl. No. 11/027,324, filed Dec. 31, 2004
Chand; Non-Final Rejection mailed Sep. 26, 2008 for U.S. Appl. No. 11/026,677, filed Dec. 31, 2004
Omanson; Non-Final Rejection mailed Sep. 30, 2008 for U.S. Appl. No. 11/026,689, filed Dec. 31, 2004
Sims; Examiner Interview Summary mailed Mar. 10, 2009 for U.S. Appl. No. 11/026,679, filed Dec. 31, 2004.
McGlennon; Notice of Allowance mailed May 13, 2009 for U.S. Appl. No. 11/026,695, filed Dec. 31, 2004.
Sims; Non-Final Rejection mailed May 7, 2009 for U.S. Appl. No. 11/027,325, filed Dec. 31, 2004.
Sims; Notice of Allowance mailed May 18, 2009 for U.S. Appl. No. 11/026,679, filed Dec. 31, 2004.
Chand; Supplemental Notice of Allowance mailed May 1, 2009 for U.S. Appl. No. 11/026,677, filed Dec. 31, 2004.
McGlennon; Supplemental Notice of Allowance mailed Sep. 10, 2009 for U.S. Appl. No. 11/026,695, filed Dec. 31, 2004.
Sims; U.S. Appl. No. 12/401,691, filed Mar. 11, 2009.
Sims; Final Office Action mailed Nov. 20, 2009 for U.S. Appl. No. 11/027,324, filed Dec. 31, 2004.
Sims; Non-Final Office Action mailed Mar. 12, 2010 for U.S. Appl. No. 11/027,324, filed Dec. 31, 2004.
Sims; Non-final rejection mailed Jan. 14, 2010 for U.S. Appl. No. 12/401,691, filed Mar. 11, 2009.
Sims; Final Office Action mailed Aug. 26, 2010 for U.S. Appl. No. 11/027,324, filed Dec. 31, 2004
Sims; Non-Final Office Action mailed Jul. 5, 2012 for U.S. Appl. No. 11/027,324, filed Dec. 31, 2004.

* cited by examiner

TRACKING USER OPERATIONS

CROSS-REFERENCE TO RELATED APPLICATION

This application claims priority to U.S. provisional application entitled, "Presentation System," having Ser. No. 60/579,343, filed Jun. 14, 2004, which is entirely incorporated herein by reference.

This application is related to copending U.S. utility patent application entitled "Frameless Presentation System" filed on the same date as the present application and accorded Ser. No. 11/026,695, which is entirely incorporated herein by reference; U.S. utility patent application entitled "Navigational Controls for a Presentation System" filed on the same date as the present application and accorded Ser. No. 11/026,689, which is entirely incorporated herein by reference; U.S. utility patent application entitled "Multiple Application Viewing" filed on the same date as the present application and accorded Ser. No. 11/027,325 which is entirely incorporated herein by reference; U.S. utility patent application entitled "Organizing Session Application" filed on the same date as the present application and accorded Ser. No. 11/026,693, which is entirely incorporated herein by reference; U.S. utility patent application entitled "Viewing Applications from Inactive Sessions" filed on the same date as the present application and accorded Ser. No. 11/026,679, which is entirely incorporated herein by reference; U.S. utility patent application entitled "Floating User Interface" filed on the same date as the present application and accorded Ser. No. 11/027,324, which is entirely incorporated herein by reference; and U.S. utility patent application entitled "Administration Manager" filed on the same date as the present application and accorded Ser. No. 11/026,677, which is entirely incorporated herein by reference.

TECHNICAL FIELD

The present disclosure is generally related to computer systems and, more particularly, is related to monitoring computer operations.

BACKGROUND

Many desktop presentation systems, such as those in use within call center environments, pose significant challenges in user productivity. For example, multiple user interface technologies, desktops, and metaphors are pervasive within today's call center environments, including for example, web browsers, X/Motif emulators, TN3270, and PC-based graphical user interfaces (GUIs). Likewise, a user in a call center environment often has to employ a variety of different applications on a computer desktop at the same time, which is often difficult. Accordingly, techniques and methods for improving user interactions with computer applications are desired. In order to improve such interactions, the interactions themselves need to be analyzed and understood. However, in large business enterprises having a multitude of employees with varying skill sets, it is difficult to monitor user interactions of interest without interfering with important business operations.

Thus, a heretofore unaddressed need exists in the industry to address the aforementioned deficiencies and inadequacies.

SUMMARY

Embodiments of the present disclosure provide systems and methods for capturing user interface operations. Briefly described, in architecture, one embodiment of the system, among others, includes logic configured to monitor an operation performed by an application interface; logic configured to determine whether the operation is at least one milestone event that is to be saved, wherein the at least one milestone event is a user-interface operation for a process in a particular field of operation; and logic configured to save milestone event information from a user, the information including identification of the user performing the operation and a computer application that was being accessed by the user for the process.

Embodiments of the present disclosure can also be viewed as providing methods for managing user-sessions. In this regard, one embodiment of such a method, among others, can be broadly sunmmarized by the following steps: identifying a user of an application program, the application program utilized to perform an activity; initiating a new session of the application program; monitoring user operations that are performed by the application program; tracking the user operations that are milestone event operations in a particular field of operation; saving details of the milestone event operation; after closing the application program, sending the milestone event operation details for the current user to a central database; and storing the milestone event operation details in the central database.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
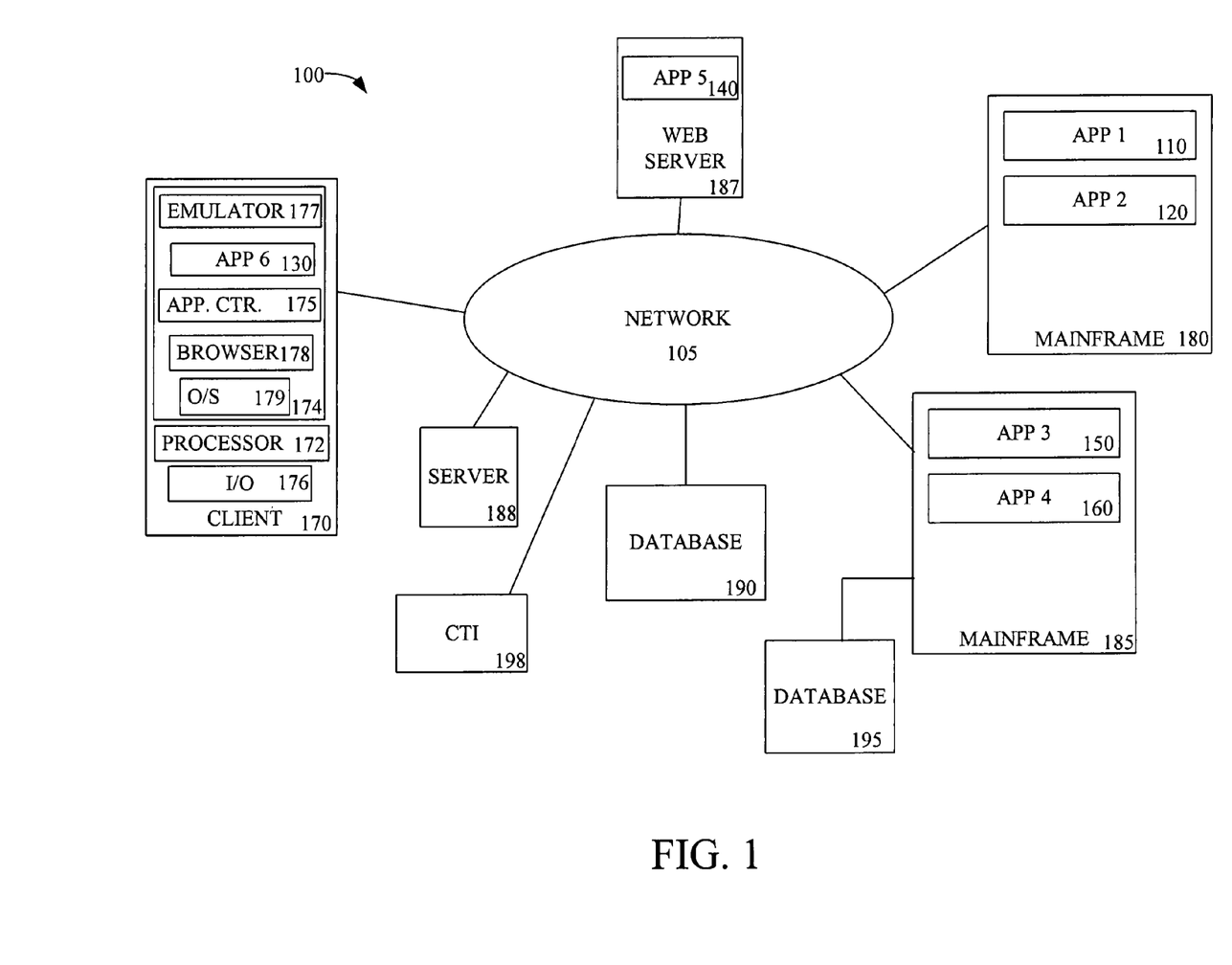
FIG. 1 is a block diagram showing one embodiment, among others, of an application tracking system.

FIG. 1 shows one embodiment of an application tracking system 100 for enabling the viewing of multiple representations of computer applications within a single user-session of a common task-oriented environment, such as a call-center environment. The application tracking system 100 in FIG. 1 comprises a general-purpose computer 170 connected to a computer network 105, such as the Internet, Intranet, local area network (LAN), wide area network (WAN), etc. Also connected to the computer network 105 are other computing devices, such as mainframe computers 180-185, servers 187-188, and network databases 190-195 that contain computer applications and data. A variety of computer applications 110-160 may be installed on mainframe computers 180-185. In addition, web-based applications 140 may be installed on the servers 187-188; and data accessed by these applications may be stored on the databases 190-195. For some embodiments, a computer telephone integration system 198 is included to retrieve data from an interactive voice response system (not shown) and route the data to an appropriate user client as a screen pop that is pre-populated with information and may launch a new user-session.

Typically in a business enterprise, mainframe computers 180-185 execute a variety of line of business (LOB) applications (in a particular field of operation) which may include older computer systems that are critical to the operation of the enterprise and are generally referred to as legacy systems 110-120, 150-160. To access legacy systems or applications 110-120, 150-160 on a mainframe computer or host 180-185, a terminal (e.g. IBM 3270) with little processing capacity was traditionally utilized, since most of the processing took place at the host or mainframe computer. The host transmitted formatted screens of character-based data to the terminal that were displayed on the terminal screen. Unlike general-purpose computers of today, a user cannot jump from program to program in a legacy system or use the operating system to transfer data from one program to another. Each screen had to be individually requested from the host, and therefore, it might take several seconds to transition from screen to screen. In addition, a user may need to log out of a session of one legacy application 110 so that the user could access a screen of another legacy application 120, 150-160. Such terminals are outdated today, since these systems often run on obsolete hardware and software and may no longer be maintainable or expandable.

Because the logic required to run legacy systems reflects a significant investment, owners of legacy systems are understandably reluctant to discard them. One possible answer is to install a software terminal emulator 177 in the general-purpose computer 170 which enables it to operate as though it were a character-based terminal. With the emulator installed, the general-purpose computer 177 looks like a standard terminal to the host 180-185.

As shown, the general-purpose computer 170 includes a variety of applications 130, 175, 178 also loaded into memory of the general-purpose computer 170. Generally, in terms of hardware architecture, as shown in FIG. 1, the computer 170 includes a processor 172, memory 174, and one or more input and/or output (I/O) devices 176 (or peripherals) that are communicatively coupled via a local interface (not shown). The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 172 is a hardware device for executing software, particularly that stored in memory 174. The processor 172 can be any custom made or commercially available processor, a central processing unit (CPU), an auxiliary processor among several processors associated with the computer 170, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company®, an 80x86 or Pentium® series microprocessor from Intel Corporation®, a PowerPC® microprocessor from IBM®, a Sparc® microprocessor from Sun Microsystems, Inc®, or a 68xxx series microprocessor from Motorola Corporation®.

The memory 174 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 174 may incorporate electronic, magnetic, optical, and/or other types of storage media. Note that the memory 174 can have a distributed architecture, where various components are situated remote from one another, but can be accessed by the processor 172.

The software in memory 174 may include one or more separate programs, each of which comprises an ordered listing of executable instructions for implementing logical functions. In the example of FIG. 1, the software in the memory 174 includes an application center 175 in accordance with the present disclosure; a suitable operating system (O/S) 179; terminal emulator 177; and a web browser application 178. A nonexhaustive list of examples of suitable commercially available operating systems 179 is as follows: (a) a Windows® operating system available from Microsoft Corporation®; (b) a Netware® operating system available from Novell, Inc.®; (c) a Macintosh® operating system available from Apple Computer, Inc®; (d) a UNIX® operating system, which is available for purchase from many vendors, such as the Hewlett-Packard Company®, Sun Microsystems, Inc.®, and AT&T Corporation®; (e) a LINUX® operating system, which is freeware that is readily available on the Internet; (f) a run time Vxworks® operating system from WindRiver Systems, Inc.®; or (g) an appliance-based operating system, such as that implemented in handheld computers or personal data assistants (PDAs) (e.g., PalmOS® available from Palm Computing, Inc.®, and Windows CE® available from Microsoft Corporation®). The operating system 179 controls the execution of other computer programs, such as the application center 175, and provides scheduling, input-output control, file and data management, memory management, and communication control and related services.

According to an exemplary embodiment, the application center 175 is a source program, executable program (object code), script, or any other entity comprising a set of instructions to be performed. When a source program, then the program needs to be translated via a compiler, assembler, interpreter, or the like, which may or may not be included within the memory 174, so as to operate properly in connection with the O/S 179. Furthermore, the application center 175 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 176 may include input devices, for example but not limited to, a keyboard, mouse, scanner, microphone, etc. Furthermore, the I/O devices 176 may also include output devices, for example but not limited to, a printer, display, etc. Finally, the I/O devices 176 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 170 is a PC, workstation, or the like, the software in the memory 174 may further include a basic input output system (BIOS) (omitted for simplicity). The BIOS is a set of software routines that initialize and test hardware at startup, start the O/S 179, and support the transfer of data among the hardware devices. The BIOS is stored in ROM so that the BIOS can be executed when the computer 170 is activated.

When the computer 170 is in operation, the processor 172 is configured to execute software stored within the memory 174, to communicate data to and from the memory 174, and to generally control operations of the computer 170 pursuant to the software. The application center 175, the O/S 179, and other local applications 130, 178, etc. in whole or in part, but typically the latter, are read by the processor 172, perhaps buffered within the processor 172, and then executed.

Referring back to FIG. 1, an application center program 175 included in the general-purpose computer 170 manages the displaying of multiple computer applications 110-160, including legacy applications 110-120, 150-160 located on mainframe computers 180-185. Typically, users (such as sales agents in a call-center environment) located in different geographical locations access LOB applications via their locally installed application center programs or applications 175. The application center 175, in some embodiments, comprises a user interface that is represented in a visual form of an application bar (e.g., a toolbar) on a desktop of the general-purpose computer 170. Generally, an application bar is a Windows control that allows a user to perform some actions by clicking a button on the application bar. An application bar often simplifies a user's job by bringing the most accessible actions as buttons that can be directly accessed by the user.

Generally, the application center 175 manages the presentation of data on the desktop of the general-purpose computer 170 or another display from other computer applications that help a user perform important business activities. In one embodiment, the application center 175 provides a usable and efficient user interface to manage multiple applications and user sessions as well as to organize the user desktop and to promote efficient work processes. Application center 175, in some embodiments, includes Application Integration Framework (AIF) and computer telephony interaction (CTI) abstraction.

In one embodiment, among others, of the application tracking system, application center 175 utilizes Microsoft® Contact Center framework version 1.0 which runs on Microsoft .Net® Framework version 1.1. Further, some embodiments of the application center 175 is integrated with additional solution components such as single sign-on, agent profiling, and event/interaction logging. For example, some embodiments of the application center 175 maintain and manage an encrypted password store that is called when a user wants to log into a given application.

Figure 2:
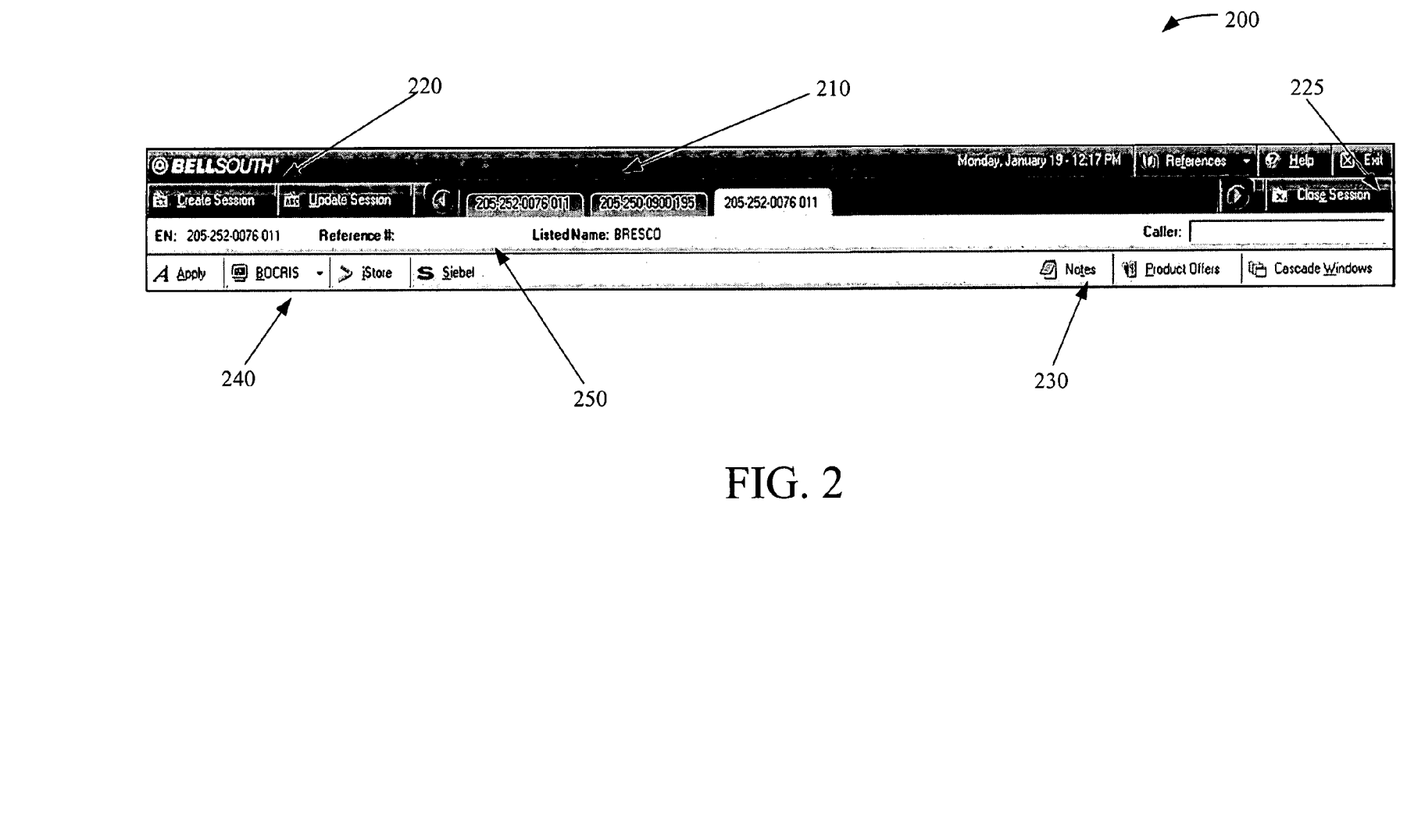
FIG. 2 is a diagram of one embodiment of a graphical toolbar interface utilized in the application tracking system of FIG. 1.

In one embodiment, among others, the application center 175 contains the following primary user interface elements: graphical toolbar interface, user-session navigator, and notepad application. The toolbar provides access to the core application center functionality including user-session opening/closing and launching applications. FIG. 2 contains an example graphical toolbar interface 200 to illustrate the user interface (UI) elements for one embodiment, among others. As mentioned below, the example toolbar interface can be used to create and close user sessions and to launch computer applications.

For the tool bar interface 200 shown in FIG. 2, a session display 210 indicates the currently active sessions where a session may be generally referred to as a group of applications that are associated with a common subject or task. The session display 210 could take the form of a tab bar, drop down list, or any control that allows the user to choose a session. When the user chooses a session from the session display 210, the currently active session's applications are hidden, and the new session's applications are displayed. The session management buttons 220, 225 control the opening and closing of sessions. When the user clicks the 'Open Session' button 220, a new session is created, displayed, and updated. Conversely, if the user clicks the 'Close Session' button 225, the current session is closed, removed from the session display, and the next session in the list is made active.

Tool buttons 230 launch additional tools such as a user-session navigator interface or notepad application. When the user clicks on a tool button 230, the tool opens and receives focus. Application buttons 240 launch applications (e.g., local applications and remote applications stored on a mainframe computer) implemented by the application center 175. When the user clicks an application button 240, a new instance of the hosted application opens and receives focus. Utilizing a Single Sign-On solution, the hosted application then authenticates the user if necessary by requesting a user-ID and/or password, for example.

Figure 3:
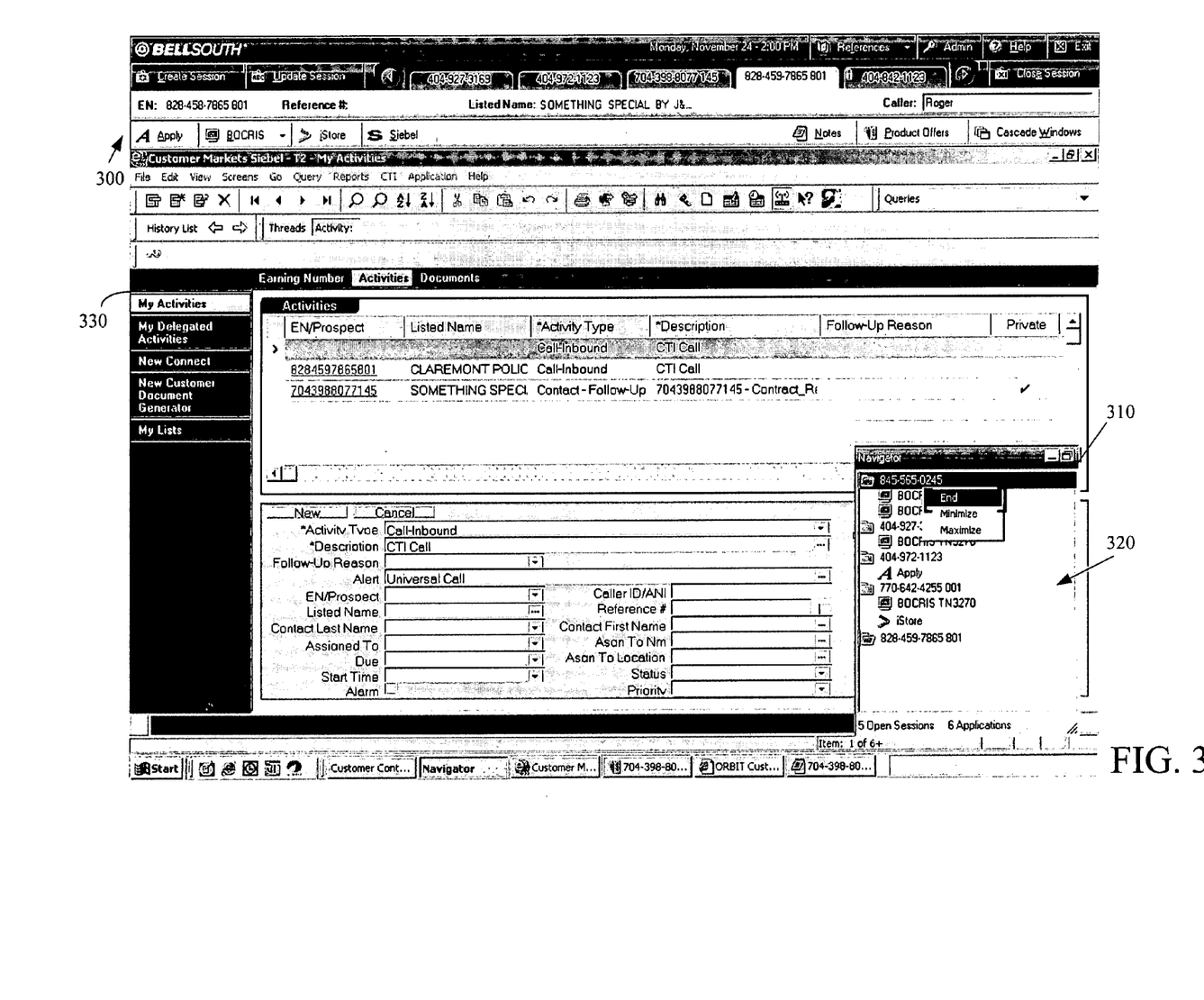
FIG. 3 is a screenshot diagram of one embodiment, among others, of a desktop arrangement of the application tracking system of FIG. 1.

The session information display 250 displays information about the current session such as phone number, customer name, etc. and updates whenever the user changes the active session. In some embodiments, a user-session navigator interface 310, as depicted in a screenshot of one embodiment 300 of a desktop arrangement of the application tracking system 100 in FIG. 3 provides a summary of the current open sessions in the desktop 330 and allows the user to switch seamlessly between them. A session view control 320 displays all of the user's active sessions either in a tree control or in a 'collapsed' button view. When a user clicks on a session within the view, the current session's applications are hidden and the new session's applications displayed. If a user clicks on an individual application within the current session, the application is brought forward and receives focus. The session view 320 may also contain functionality to display an application instance not within the current session. For example, if the user clicks on an application not within the current session, the application is displayed in the current context and receives focus. In this way, the application tracking system 100 allows a user to quickly see what applications are open within each session and allows the user to choose to pull an application from one session (e.g., an inactive session) into another session (e.g., an active session) through the use of the user-session navigator interface. Generally, within a Windows environment, a session is identified by a session identifier, and the graphical window controls representing the applications that have been launched during the respective session are identified by respective Globally Unique Identifiers (GUIDs). Therefore, a first session may be uniquely identified and associated with a first GUID and a second GUID. Accordingly, a second session may be uniquely identified and associated with a third GUID.

One embodiment of the application center 175 is built-on Microsoft's .NET® Framework. Accordingly, one embodiment provides a hosted web application class with which to integrate web applications. The hosted web application class contains an ActiveX® version of Microsoft's Internet Explorer® web browser and implements the hosted application interface. ActiveX® web browser executes actions via a scripting language or by redirecting to a specific uniform resource locator (URL). To implement more advanced action functionality, an enhanced hosted web application class is created that allows the execution of successive actions defined by an XML-based macro language. The XML macro language supports the ability to perform successive requests, populate form fields, and execute conditional logic. Actions defined in the XML macro language can be modified without requiring recompilation, allowing for additional extensibility following deployment.

If the XML macro language is insufficient to execute all of the necessary functionality or cannot interface with a web application due to embedded objects such as applets or ActiveX control, the web application can be wrapped within a .NET Windows® form containing the ActiveX® version of the Internet Explorer® web browser (or some other compatible web browser, for example) and specific code written in the form to interface with the application. Alternatively, if possible, the web application itself could be modified to process actions passed via web request.

In order for an application to be hosted by the application center 175, the application typically implements a hosted application interface. The application host interacts with a variety of classes including windows forms and web applications. Some embodiments of the application center 175 provides an external hosted application class to integrate with applications that enable scripting via JavaScript® or VBScript® but cannot actually be hosted within the application center user interface like a Windows control or a web application. Such applications include the Microsoft Office® suite products: Word®, Excel®, etc. The external hosted application implements the hosted application interface and executes actions utilizing the scripting language. If an application provides an ActiveX® interface, the ActiveX® control is hosted within a .NET Windows® user control in order to integrate the application within the application center 175. The user control implements the hosted application interface to allow the application host to integrate with the application. The Windows Form executes actions by calling the API exposed by the ActiveX® control. Once the ActiveX® control is "wrapped" in the user control, the application is incorporated into the framework as previously described.

If an application provides a COM interface, the application is hosted by creating a .NET Windows® user control to integrate with the application via the COM interface. The user control allows the user interface to display information from the application. The user control implements the hosted application interface to allow the application host to integrate with the application. To execute actions, the user control calls methods exposed by the COM application. The user control is incorporated into the application center 175, as previously described.

In some embodiments, data access and data update is typically done via web services. The web services use .NET® Framework data to access a server 188 (e.g., SQL server) as the data source. If an application provides a web service interface, the application is hosted by creating a .NET Windows® user control to integrate with the application via the web service. Similar to the COM application, the user control provides the user interface to display information from the application. The user control implements the hosted application interface to allow the application host to integrate with the application. To execute actions, the user control calls web methods exposed by the web service. The user control is incorporated into the application center 175, as previously described.

At initialization, the application center 175 creates the application host object. The application host object requests application information from web services. The application center 175 utilizes this information to populate the application bar 200 and any other user interface elements (such as user-session navigator 310). Following initialization, the application center 175 sends commands to and receives events from the application host in order to manage sessions.

For example, when the user clicks on the application bar, the application center 175 requests a new application instance from the application host. The application host creates a new instance and returns it to the application center 175. When the user asks for an action to be performed (task, focus, etc.), the application center 175 requests the action from application host. The application host finds the appropriate application by session and instance and requests the action. The hosted application then performs the action. The application center 175 can also share data between applications utilizing actions. When requesting an action, the application center 175 can provide the application host with an XML string containing any data specific to that action. When the hosted application executes the action, it can utilize the data appropriately. Such data sharing can prevent re-keying of information, such as customer name and telephone number, for example.

As previously mentioned, disparate technologies and applications may be interfaced using the application center 175 system as described in the present disclosure. A variety of the applications and their functions in a call center environment, for some embodiments, are as follows. A Siebel® Call Center application allows viewing customer-specific promotions; viewing and performing customer follow-ups; and locating customer records. BOCRIS allows viewing detailed billing information including screens directed toward local service itemization (LSI), billing, customer service reports (CSR), pending orders, etc. Also, an Apply web application (or similar application) for processing wireless telecommunication services is integrated into the .NET® client of the application center 175, for some embodiments involving call-center environments, in order to view promotions and eligibility; placing orders; and checking customer credit information. In addition, an iStore web application (or similar application) for processing digital subscriber line (DSL) service orders is integrated into the .NET client of the application center 175. In particular, the iStore web application enables DSL Loop Qualification & Order Placement for a call-center environment. Single Sign-On support, for some embodiments, is implemented in for the iStore and Apply application classes. An Orbit web application (or similar application) is integrated into the .NET® client as a link from the toolbar interface 200 for some embodiments. The link launches the Orbit web application. Other embodiments also incorporate other applications such as PC-based applications.

In some embodiments, Siebel® 6.3 may not be integrated by the application center 175 as a typical hosted application. Because some Siebel® implementations are integrated with CTI 198, Siebel® preferably operates in a process outside of the application center framework. The application center interacts with Siebel® independently of the Application Integration Framework. The application center 175 exposes itself as a COM interface that Siebel® calls to notify the application center 175 of events such as the CTI screen pop. In addition, the application center 175 calls the COM interface (that Siebel® exposes) to retrieve information about the current Siebel® record (telephone number, name, etc.) and the current Siebel® state (page, view, etc.).

For some embodiments, a RUMBA® 3270 Emulator, which hosts the Business Office Customer Record Inquiry System (BOCRIS), exposes an ActiveX® interface that can be integrated by the application center 175. A user control is created to host the ActiveX control. The user control hosting the RUMBA® ActiveX control implements the hosted application Interface. The user control also implements actions that are called by the application center 175, such as logging in the user and navigating to a specific BOCRIS screen.

As previously mentioned, the toolbar interface 200 contains a variety of buttons to help a user manage and control the presentation of windows displayed on the desktop 330. Although many of the embodiments discussed herein involved call-center environments, the present disclosure is not limited to call-center environments. Other lines of business activities such as those in banking, accounting, etc. are also contemplated.

In some embodiments, the application center 175 provides a milestone logging routine that logs information from the various computer applications used during an individual session (where a session is generally referred to as a particular call between a particular user and a particular customer in a call-center environment, for example). For some embodiments, milestone logging is linked to individual users and to individual sessions. Further, web services are used to communicate with the application center 175 and to log the milestone events (via asynchronous batch call, for example) in a network database 190, 195, in some embodiments. Pertinent milestone logging information, for some embodiments, involves the types of user-interface operations that are performed by a user within a user session. Since users may be located across multiple geographic locations, milestone logging data may be stored in multiple network databases 190, 195. Therefore, the application center 175 may be configured to report milestone logging data to a particular network database 190, 195. Accordingly, a central reporting data mart gathers all logging/milestone information from each network database for future data mining, in some embodiments.

While there may be no difference, with respect to milestone logging, between different types of users, some embodiments of the application center 175 is configured to track different milestone data for different departments or business units. In this way, a particular business department can capture particular user interface operations and logging granularity that are particularly pertinent to that particular business department. For example, some embodiments of the application center 175 tracks information such as the following business metrics:

The amount of time each session is active in minutes;
The amount of time each application within a session is active;
Time spent in duration of an active session;
Time spent in each application within an active session, while it is in focus; and
Measure application instances launched by application center 175.

Figure 4:
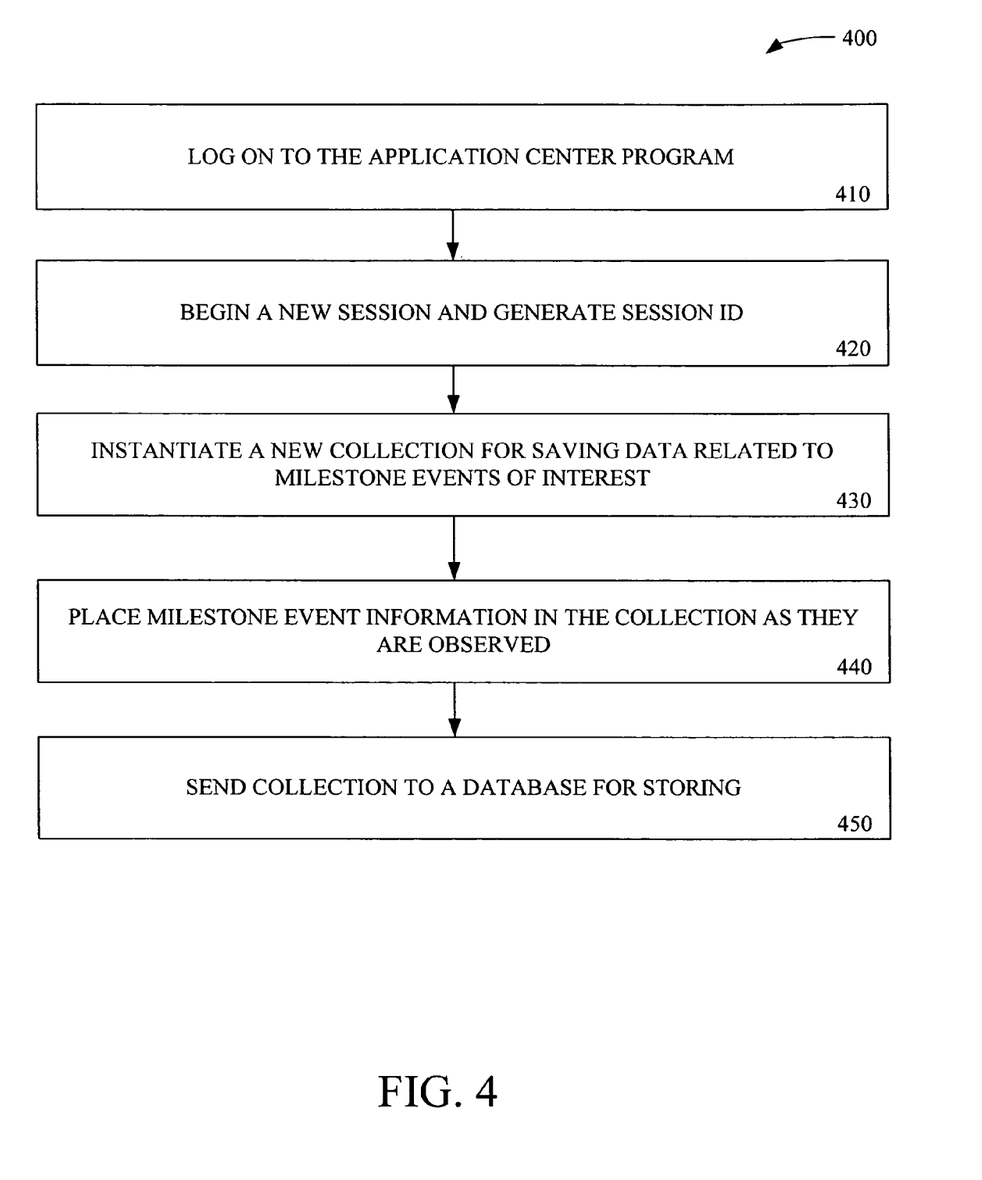
FIGS. 4-5 are flowcharts describing the functionality of various embodiments, among others, of the application tracking system of FIG. 1.

Different embodiments may employ different methods or routines for logging milestone events. One embodiment, among others, is presented as follows. As shown in FIG. 4, a user (e.g., a Sales Associate, etc.) logs (410) on to the application center program 175 and launches the application center program 175. When the user receives a phone call from a customer and begins (420) a new session for this customer, a session ID is generated for association with this session. A new collection (e.g., a dataset, XML file, or some other type of collection) is instantiated (430). Different user interface events or operations are associated as milestone logging events. These events are placed (440) in the collection and are given an application ID as to where the event came from, the user's ID, and a timestamp, for some embodiments. As new events are generated, they are also added to the collection for the particular session. When the user is finished with the session and closes the session, a web service is called by the application center 175. The web service sends (450) the collection to the network database (via asynchronous batching, for example). Further, each time a user creates or refreshes a session, the application center 175 systematically captures a "fingerprint", or audit trail data, to identify pertinent information about the account access (regardless of whether any activities/changes were performed). The following are examples of the type of data that might be captured: computer system used to access the account; date/timestamp of the access; and user-ID of the logged-in user. For some embodiments, collected data is compiled and sent to the network database daily.

Figure 5:
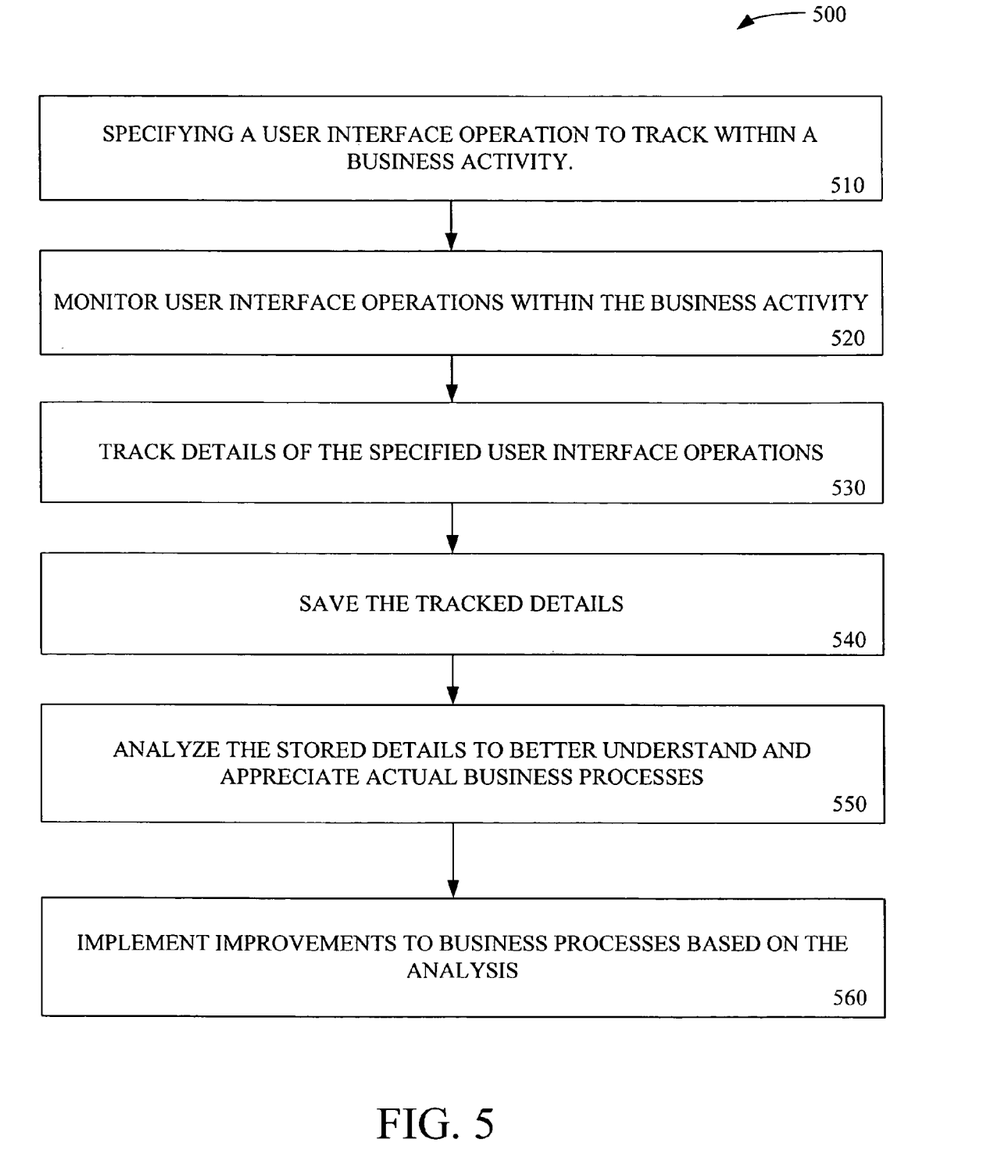

Therefore, embodiments of the application tracking system 100 monitor and track user interface operations in order to gather important information about actual business processes. The flowchart of FIG. 5 shows the functionality of another representative implementation of the application tracking system 100 of the present disclosure. As depicted in FIG. 5, the functionality of one embodiment of the application tracking system 100 or method 500 may be construed as beginning at the step of specifying (510) a user interface operation to track within a business activity. The application center 175 is configured to monitor (520) user interface operations and to track (530) details (e.g., length of time, number of occurrences, etc.) of the specified user interface operations. The tracked details are saved (540) and stored periodically (such as daily, for example). Then, the stored details are analyzed (550) to better understand and appreciate actual business processes as performed by users within a business. Based on the analysis, improvements are implemented (560) to improve the business processes. For example, based upon the amount of time a user has an application window in focus, a management analyst can assess whether the user needs development in performing a task or activity associated with the application window. If it takes one person ten minutes to perform an activity and another person sixteen minutes, the management analyst can examine compiled tracking information to understand the discrepancy and why one person spends more time doing a task than another person. Accordingly, tracking information can also provide a productivity measurement of the activity work-level of a user. For example, tracking information may reveal that a user idly sits at his or her station for an inordinate amount of time.

It should be emphasized that the above-described embodiments of the present disclosure, particularly, any "preferred" or "exemplary" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure.

Therefore, having thus described the invention, at least the following is claimed:

1. A system for capturing user interface operations, comprising:
  a processor; and
  memory for storing code that when executed causes the processor to perform operations, the operations comprising:
    receiving a call from a calling customer that begins a call session;
    monitoring events input to a graphical user interface by a user during the call session;
    timestamping receipt of each one of the events;
    determining whether each one of the events is a milestone event that is to be saved, wherein the milestone event is a user-interface operation for a process in a call center;
    saving the milestone event in a collection;

associating the milestone event with the calling customer, with an identification of the user, identification of a computer application that was being accessed by the user for the process, an amount of time spent in the computer application during the call session, a number of computer application instances launched during the call session, and a timestamp of the receipt of the milestone event; and receiving a first input from the user to open a new session and terminating the call in response to receiving a second input from the user to close the call session, wherein the first input fails to power up the processor and the second input fails to power down the processor, wherein the milestone event is saved and placed in the collection for the call session after termination of the call.

2. The system of claim 1, wherein the operations further comprise compiling the milestone event from a plurality of users.

3. The system of claim 1, wherein the milestone event is customized according to business department.

4. The system of claim 1, wherein the operations further comprise training the user based on the milestone event.

5. The system of claim 1, wherein the milestone event describes an amount of time that the call session is active.

6. The system of claim 1, wherein the milestone event comprises an amount of time that an application window is opened.

7. A method for capturing user interface operations, comprising:

receiving a call to a call center from a calling customer that begins a call session;

monitoring events by a processor that are input to a graphical user interface by a user during the call session;

timestamping receipt of each one of the events;

determining by the processor whether each one of the events is a milestone event that is to be saved, wherein the milestone event is a user-interface operation for a process in the call center;

saving the milestone event in a collection in memory;

associating the milestone event with the calling customer, with an identification of the user, identification of a computer application that was being accessed by the user for the process, an amount of time spent in the computer application during the call session, a number of computer application instances launched during the call session, and a timestamp of the receipt of the milestone event; and receiving a first input from the user to open a new session and terminating the call in response to receiving a second input from the user to close the call session, wherein the first input fails to power up the processor and the second input fails to power down the processor, wherein the milestone event is saved and placed in the collection for the call session after termination of the call.

8. The method of claim 7, further comprising periodically compiling milestone events for a plurality of users.

9. The method of claim 7, further comprising analyzing stored milestone events to determine if the user needs additional training.

10. The method of claim 7, further comprising:

specifying different user operations that qualify as the milestone event; and tracking milestone events according to business department.

11. The method of claim 7, further comprising monitoring an amount of time that the user is active within the call session.

12. The method of claim 7, further comprising monitoring an amount of time that an application window is opened during the call session.

13. A computer readable memory storing a program that when executed by a processor causes the processor to perform operations, the operations comprising:

receiving a call to a call center from a calling customer that begins a call session;

monitoring events input to a graphical user interface by a user during the call session;

timestamping receipt of each one of the events;

determining whether each one of the events is a milestone event that is to be saved, wherein the milestone event is a user-interface operation for a process in the call center;

saving the milestone event in a collection;

associating the milestone event with the calling customer, with an identification of the user, identification of a computer application that was being accessed by the user for the process, an amount of time spent in the computer application during the call session, a number of computer application instances launched during the call session, and a timestamp of the receipt of the milestone event; and receiving a first input from the user to open a new session and terminating the call in response to receiving a second input from the user to close the call session, wherein the first input fails to power up the processor and the second input fails to power down the processor, wherein the milestone event is saved and placed in the collection for the call session after termination of the call.

14. The computer readable memory of claim 13, wherein the operations further comprise:

periodically compiling milestone events for a plurality of users; and specifying different user operations that qualify as the milestone events.

* * * * *